(12) United States Patent
Jakobsen (10) Patent No.: US 11,459,886 B2
(45) Date of Patent: Oct. 4, 2022

(54) TUNNEL PROFILE ELEMENT

(71) Applicant: Foamrox AS, Arendal (NO)

(72) Inventor: Rolf Jakobsen, Mandal (NO)

(73) Assignee: FOAMROX AS, Arendal (NO)

( * ) Notice: Subject to any disclaimer, the term of this patent is extended or adjusted under 35 U.S.C. 154(b) by 0 days.

(21) Appl. No.: 16/646,545

(22) PCT Filed: Sep. 10, 2018

(86) PCT No.: PCT/NO2018/050227
§ 371 (c)(1),
(2) Date: Mar. 11, 2020

(87) PCT Pub. No.: WO2019/059776
PCT Pub. Date: Mar. 28, 2019

(65) Prior Publication Data
US 2020/0277855 A1  Sep. 3, 2020

(30) Foreign Application Priority Data

Sep. 22, 2017 (NO) .................................. 20171522

(51) Int. Cl.
*E21D 11/00* (2006.01)
*B32B 1/00* (2006.01)
*B32B 5/18* (2006.01)
*B32B 7/12* (2006.01)
*E21D 11/38* (2006.01)

(52) U.S. Cl.
CPC ................ *E21D 11/00* (2013.01); *B32B 1/00* (2013.01); *B32B 5/18* (2013.01); *B32B 7/12* (2013.01); *E21D 11/38* (2013.01); *B32B 2250/40* (2013.01); *B32B 2255/26* (2013.01); *B32B 2266/057* (2016.11); *B32B 2607/00* (2013.01)

(58) Field of Classification Search
CPC ......... E21D 11/00; E21D 11/38; E21D 11/04; E21D 9/14
USPC ................................... 405/150.1, 150.2, 151
See application file for complete search history.

(56) References Cited

U.S. PATENT DOCUMENTS

| 3,561,223 | A | | 2/1971 | Tabor | |
|---|---|---|---|---|---|
| 4,558,969 | A | * | 12/1985 | FitzSimons | ............. E01F 5/005 405/124 |
| 4,940,360 | A | | 7/1990 | Weholt | |
| 8,662,796 | B2 | | 3/2014 | Brown | |

(Continued)

FOREIGN PATENT DOCUMENTS

| CN | 1873297 | * 12/2006 |
|---|---|---|
| CN | 101638990 | 2/2010 |

(Continued)

OTHER PUBLICATIONS

International Search Report mailed in PCT/NO2018/050227 dated Dec. 6, 2018.
Search Report mailed in NO 20171522 dated Apr. 17, 2018.

*Primary Examiner* — Sean D Andrish
(74) *Attorney, Agent, or Firm* — Wissing Miller LLP (57) ABSTRACT

The present invention disclose a tunnel profile element (10, 20A, 20) comprising a lightweight body constituted by foam glass panels sprayed with unbroken polyurea layer providing a fire resistant coating, and which is providing increased mechanical integrity of the tunnel profile element (10, 20A, 20).

27 Claims, 8 Drawing Sheets

(56) References Cited

U.S. PATENT DOCUMENTS

| | | | |
|---|---|---|---|
| 2004/0050100 A1* | 3/2004 | Ungerleider | C03C 11/007 65/22 |
| 2006/0172683 A1* | 8/2006 | Kennedy | E21F 1/14 454/169 |
| 2007/0138857 A1 | 6/2007 | van Houten | |
| 2009/0126479 A1* | 5/2009 | Loncaric | E21D 11/107 73/290 R |
| 2011/0103893 A1* | 5/2011 | Santos | E21D 9/14 405/150.1 |
| 2013/0051918 A1 | 2/2013 | Rayner et al. | |
| 2013/0343822 A1* | 12/2013 | Swamy | E21D 11/38 405/150.2 |
| 2015/0198041 A1* | 7/2015 | Bond | E21D 11/381 427/8 |

FOREIGN PATENT DOCUMENTS

| | | | |
|---|---|---|---|
| CN | 104329102 | | 2/2015 |
| CN | 104405411 | * | 3/2015 |
| CN | 105840210 | * | 8/2016 |
| CN | 108331596 | | 7/2018 |
| DE | 4403978 | | 8/1995 |
| EP | 1350922 | | 10/2003 |
| EP | 1564369 | | 8/2005 |
| EP | 2287414 | | 2/2011 |
| JP | 2012007410 | * | 1/2012 |
| WO | 2004024645 | | 3/2004 |
| WO | 2017171558 | | 10/2017 |

\* cited by examiner

TUNNEL PROFILE ELEMENT

CROSS-REFERENCE TO RELATED APPLICATIONS

This application is a 371 of PCT/N02018/050227 filed on Sep. 10, 2018, published on Mar. 28, 2019 under publication number WO 2019/059776, which claims priority benefits from Norwegian Patent Application No. 20171522 filed Sep. 22, 2017, the disclosure of each is incorporated herein in their entirety by reference.

FIELD OF THE INVENTION

The present invention is related to a tunnel profile element comprising sidewalls, roof and floor elements of foam glass panels that are assembled and sprayed with an unbroken layer of polyurea covering all visible outside surfaces of the tunnel profile element.

BACKGROUND OF THE INVENTION

Road and railway tunnels are usually expensive to make and security issues related to possible fires and accidents inside tunnels are well known challenges in prior art. Conventional methods of building tunnels usually comprises drill and blast methods providing the necessary and intended tunnel profile at correct dimensions. It is also common to adapt and assemble concrete wall elements, thermal isolation, fire protections, electric wires, communication lines, traffic lights, electric lightning, water drainage etc. corresponding to the tunnel profile.

In recent years, it is common to provide images of the raw rock tunnel walls by scanning the rock faces of the drilled and blasted tunnel with a moving laser thereby identifying locations on the walls suitable for drilling bolts holding concrete wall elements being assembled afterwards. The information from computerized images captured via the laser scanning can be used to direct and position drilling equipment moving inside the tunnel while drilling. Then the mounting of the concrete elements is much easier and faster after the bolts have been attached to the rock walls.

The weight of concrete is high and the ability to handle heavy weight objects inside a limit space like a tunnel limits the practical size of concrete wall elements of tunnels.

Further, tunnels need to be equipped with additional infrastructure elements like escape-route tunnels, emergency communication systems, warning systems, airing channels that can ventilate smoke from fires etc., and that can ventilate exhaust from cars etc. Supplying fresh air from the outside of the tunnel is also necessary. It is also necessary that any additional infrastructure element is fire and water and frost protected.

Prior art tunnel designs includes many parts providing solutions to respective technical problems. Concrete walls may provide protection against parts of rocks that may loosen from the tunnel rock faces and fall down onto the traffic lanes or railway tracks, for example. Protection against ice formation and frost control is necessary since water freezing to ice increases in volume as known in prior art. The forces induced on the surroundings from freezing water, for example water left in cracks in the rock face of the tunnel, can be large in magnitude and can result in breaking stones free from the rock wall of the tunnel. Further, frost may make for example the roads in the tunnel very slippery. When concrete wall elements are assembled, it may be left voids between the concrete element surfaces facing the rock surface of the tunnel. Water may assemble in these voids, and if the ice formation protection is insufficient, the water in the voids may cause structural damage to the concrete walls of the tunnel.

US 200700138857 A1 disclose a vehicle with a milling arrangement on the top side of the machine. The milling arrangement includes a milling device for grinding an upper tunnel wall surface like tunnel ceilings of traffic tunnels. Such a vehicle with the milling arrangement is suitable for treating tunnel walls such that a desired limited surface roughness and removal of carbon black is achieved. This assures that a lining, which is applied to the tunnel ceiling and wall surface, is sufficiently attached to the surfaces.

U.S. Pat. No. 8,662,796 B2 disclose a method for lining tunnel walls or ceilings with protective nets or the like, web-shaped protective net material is unwound from a reel and is fastened to the tunnel walls or ceiling by tie bolts. The reel is rotatable arranged. The rotation of the reel about a shaft is controlled in order to unwind the protective net material, the shaft being mechanically moved in steps along the tunnel walls or ceiling together with the reel. The stretching and mechanically fastening of the protective net is preferably executed when unwound in each step.

U.S. Pat. No. 3,561,223 A disclose a tunnel making machine adapted not only to tunnels through the earth, but also to concurrently form a concrete wall in the tunnel. Forms for the concrete wall are erected by the machine at the head end thereof and are removed by the machine at the tail end thereof. The forms remain in place only long enough for the concrete to harden and are constantly reused, those from the tail end being transferred to the head end in a continuous process of form reuse. Removal of the forms at the tail end of the machine leaves the tunnel complete rearward of the machine with a smooth concrete wall or bore.

WO 2004/024645 A3 disclose a method of producing a foamed glass composite panel, wherein the glass and a 0.1-20.0% by weight of at least one non-sulfur based foaming agent, mixing it together, and heating the mixture to a temperature sufficient to foam it. Then cooling the foamed mixture forming at least one foamed glass substrate. During or after the cooling step, material is bonded or attached to at least one side of the foamed glass substrate forming a composite panel.

CN 101638990 B disclose a fireproof thermal-insulation layer of a tunnel and a construction method thereof. The fireproof thermal-insulation layer comprises a polyurethane thermal-insulation layer connected with two linings of the tunnel and an external fireproof layer, wherein the fireproof layer is constituted by pressing one or two kinds of medium-alkali glass fiber cloth and non-woven fabric, which are taken as basal materials, and waterproof and fireproof components.

The cost of making for example safe road and/or railway tunnels are high and therefore there is a need of improved tunnel designs providing cheaper tunnels that preferably are simpler to build, faster to build and which requires less maintenance and improved lifetime. It is also a need of facilitating simple and cheap installation of additional infrastructure elements in tunnels.

OBJECT OF THE INVENTION

It is a further object of the present invention to provide an alternative to the prior art.

In particular, it may be seen as an object of the present invention to provide a lightweight tunnel profile element facilitating lining of tunnel profiles as well as installation of respective tunnel infrastructure elements.

SUMMARY OF THE INVENTION

Thus, the above described object and several other objects are intended to be obtained in a first aspect of the invention by providing a tunnel wall element constituted by a lightweight element having thermal insulating properties coated with a fireproof coating increasing the mechanical integrity of the lightweight element.

An aspect of the present invention is to provide a tunnel profile element adaptable to respective aperture dimensions of raw tunnels, wherein the tunnel profile element comprises foam glass panels, wherein at least a tunnel floor element, at least respective sidewall elements and at least a roof element of foam glass panels are hold together by a sprayed unbroken surface layer of polyurea on at least all visible outside surfaces of an assembled tunnel profile element.

Another aspect of the present invention is to provide a method of assembling a tunnel profile element comprising steps of:
  defining a shape and dimension of the tunnel profile element,
  arranging a support frame with the shape and dimension of the defined tunnel profile element,
  holding respective adapted foam glass panels in the support frame; and
  spraying an unbroken layer of polyurea on at least all visible outside surfaces of the foam glass panels supported by the supporting frame.

Respective aspects of the present invention may each be combined with any of the other aspects. These and other aspects of the invention will be apparent from and elucidated with reference to the embodiments described hereinafter.

DESCRIPTION OF THE FIGURES

The tunnel wall element and the method of building tunnel walls with the tunnel wall elements according to the present invention will now be described in more detail with reference to the accompanying figures. The accompanying figures illustrate an example of embodiment of the present invention and are not to be construed as being limiting to other possible embodiments falling within the scope of the attached claim set.

DETAILED DESCRIPTION OF AN EMBODIMENT

Although the present invention is described in connection with specified embodiments, it should not be construed as being in any way limited to the presented examples. The scope of the present invention is set out by the accompanying claim set. In the context of the claims, the terms "comprising" or "comprises" do not exclude other possible elements or steps. The mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

A first aspect of the present invention is to combine water, fire and frost prevention features in a lightweight tunnel profile element constituted by assembled foam glass panels sprayed with a layer of unbroken polyurea.

Figure 1:
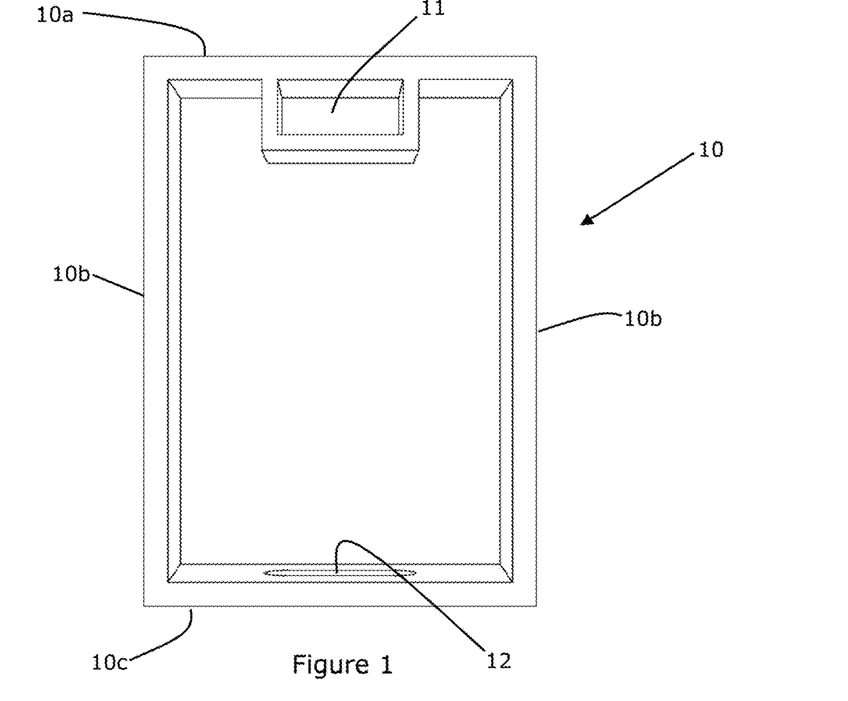
FIG. 1 illustrates an example of a tunnel profile element according to the present invention.
Figure 7A:
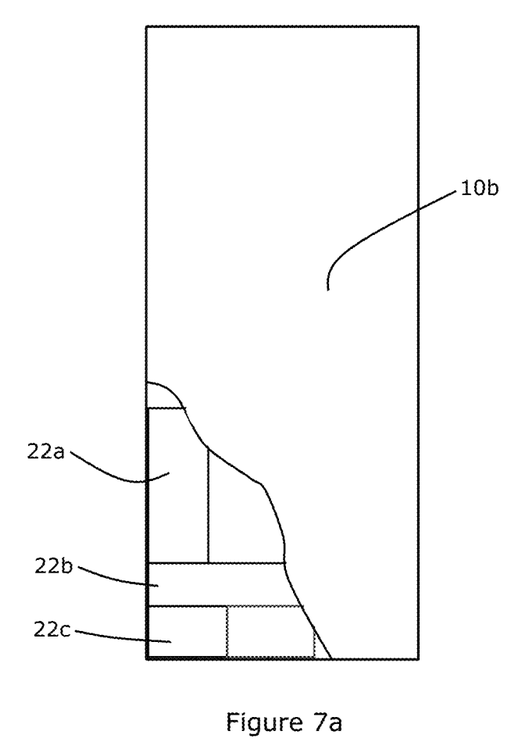
FIGS. 7a-7b illustrate details of a tunnel profile element according to the present invention.

FIG. 1 illustrates an example of a rectangular shaped tunnel profile elements 10 according to the present invention. FIG. 7a illustrate how a plurality of foam glass kernels 22a, 22b, 22c etc. are assembled and coated with polyurea.

Av profile element is made with a periphery dimension adapted to the aperture of a raw tunnel profile of a location of the tunnel wherein the profile element is intended to be used. The length of a tunnel profile element according to the present invention is in principle arbitrary, but is usually manufactured with a set of different lengths for a specific tunnel. When lining a raw tunnel with tunnel profile elements according to the present invention, a plurality of tunnel profile elements are inserted into the tunnel opening from one end of the tunnel, one element after the other. The tunnel profile elements are attached together thereby covering the complete periphery and length of the raw tunnel surface including the raw tunnel roof, the raw walls of the tunnel as well as the bottom or floor of the raw tunnel. If the tunnel is straight, longer tunnel profile elements may be made with a same length. If there are curves in the tunnel, smaller length of the tunnel profile elements makes the lining smother along the curved tunnel section. It is also within the scope of the present invention that for example the width of a tunnel profile element at the side of the profile element facing inwards to the interior of the tunnel can be larger or smaller than the width of the profile element facing towards the raw tunnel side surfaces. In this manner, the elements can be adapted and assembled according to any type of curved tunnel surfaces.

The roof element of the tunnel profile element illustrated in FIG. 1 is arranged with an additional infrastructure element 11 being for example an element constituting an airing channel. At the bottom or floor of the tunnel profile element 10 there is an opening 12 adapted to receive fluids, for example surface water, wherein the opening 12 is in fluid communication with a drainage pipe arranged below the bottom of the tunnel profile element 10. The opening 12 may not be present in all tunnel profile elements according to the present invention.

Figure 2:
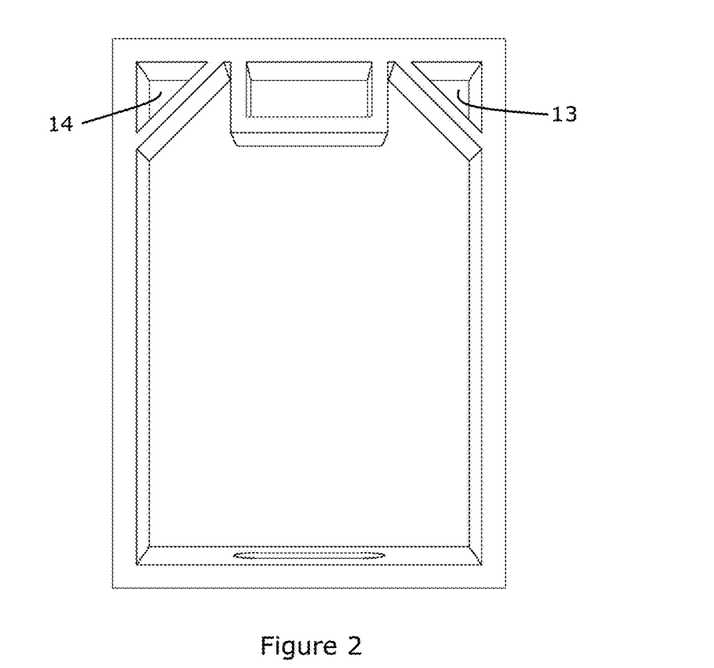
FIG. 2 illustrates another example of a tunnel profile element according to the present invention.

FIG. 2 illustrates another example of embodiment comprising further additional infrastructure elements 13, 14. The additional infrastructure elements 13, 14 may be used as additional airing channels, for example supplying fresh air into the tunnel from the outside of the tunnel. In such a case, additional openings will be arranged on a side surface of the airing channels 13 and 14 as well as the airing channel 11 discussed above. However, these additional infrastructure elements may be used to support other items like power cables, communication lines etc.

Figure 3:
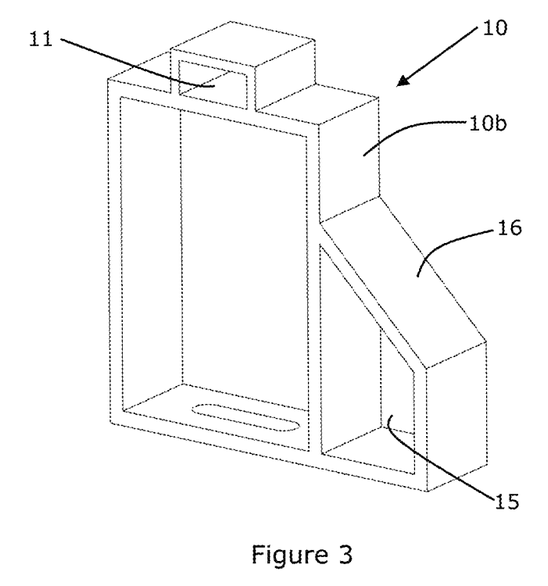
FIG. 3 illustrates another example of a tunnel profile element according to the present invention.

FIG. 3 illustrates another example of embodiment of the present invention wherein an escape-route tunnel element 15 is arranged on an adjacent sidewall element 10b of a tunnel profile element (10). The roof 16 of the escape-route element 15 is inclined downwards relative to the adjacent sidewall element 10b. Water inside rocks of the tunnel can then flow over the inclined roof 16 and down on the side of the escape-route element 15 and be collected by arranged channels at the bottom of the raw tunnel.

Figure 5:
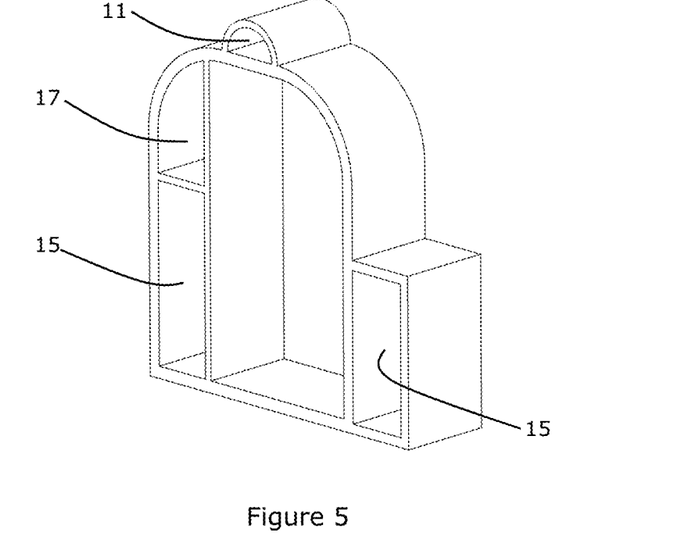
FIG. 5 illustrates another example of a tunnel profile element according to the present invention.

FIG. 5 illustrates another example of embodiment of the present invention, wherein the roof element 10a of the tunnel profile element is curved, and wherein an airing channel. 11 is arranged on an outside surface of the roof element 10a. The FIG. 5 illustrates an example, wherein an escape-route tunnel element is arranged on both sides of the tunnel profile element 10. in addition, an additional channel 17 is arranged on top of the left most escape-route element 15, For example, an emergency communication line may be arranged inside the channel 17.

Figure 8:
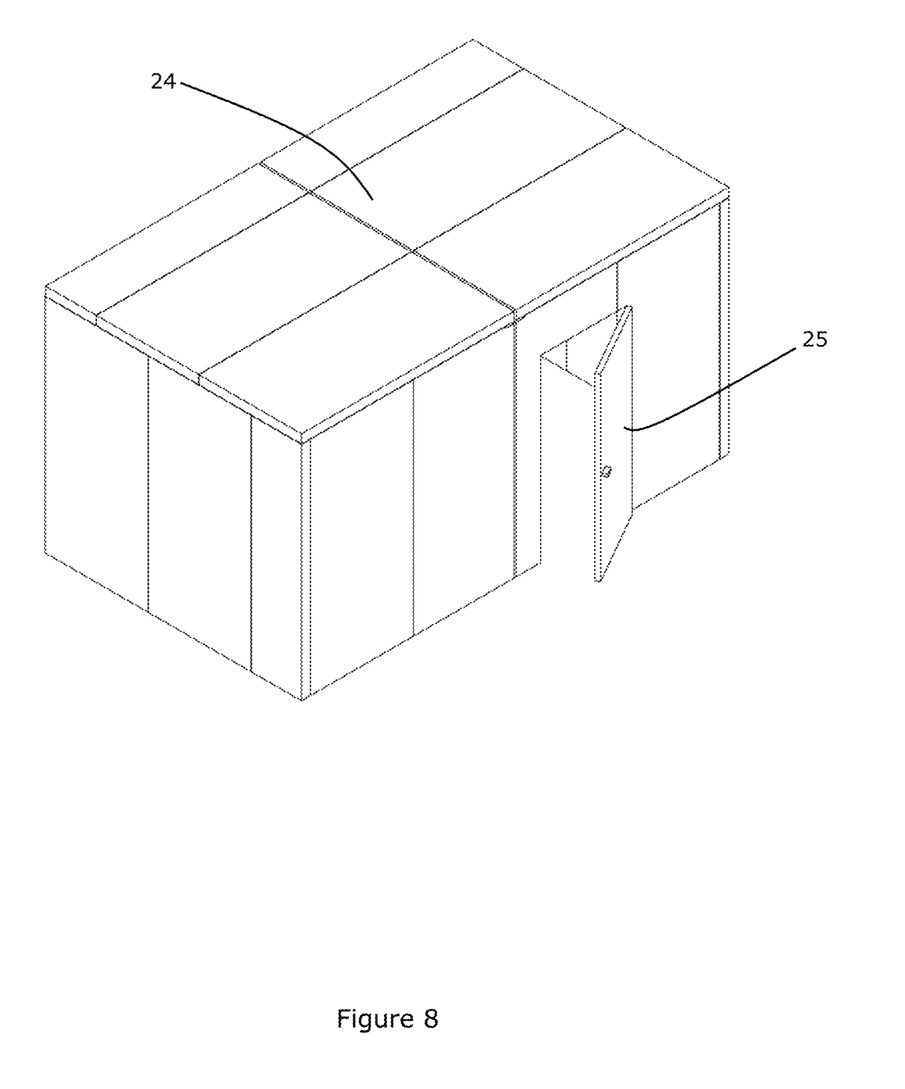
FIG. 8 illustrates an example of a cabinet according to the present invention.

Further examples of additional infra structure elements that can be added to a tunnel profile element 10 according to the present invention, can be fire proof and water tight cabinets 24 as illustrated in FIG. 8. Inside such cabinets it is possible to store for example fire extinguishers, an emergency telephone etc. The cabinet is made out of polyurea sprayed foam glass panels, including an adapted cabinet door 25.

Figure 6A:
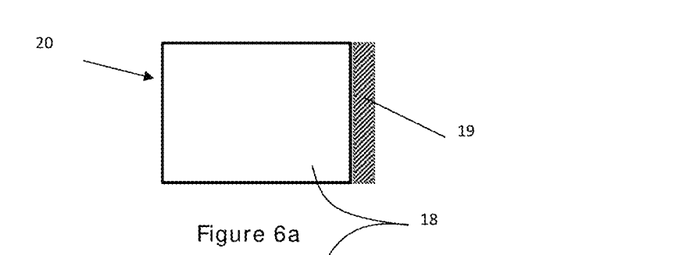
FIG. 6a-6c illustrate an example of assembling tunnel profile elements according to the present invention.
Figure 6B:
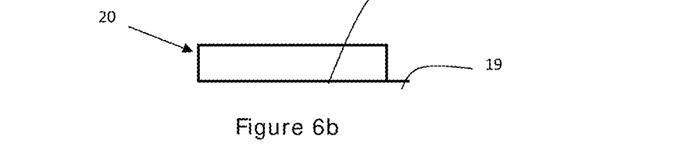
Figure 6C:
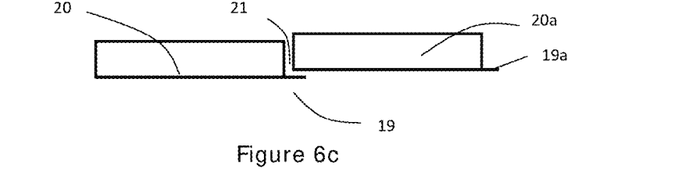

FIG. 6a, FIG. 6b and FIG. 6c illustrates some principles that is used when joining a first tunnel profile element 20 to another tunnel profile element 20a.

The illustration is only a part of a full tunnel profile element, for example a sidewall of tunnel profile element. The illustrated sidewall is a rectangular object with a certain thickness. The illustration is not intended to illustrate an actual tunnel profile element, but only the principle of how to join tunnel profile elements.

With reference to FIG. 6a and FIG. 6b, when spraying polyurea on an tunnel profile element 10 according to the present invention, a patch 19, 19a of polyurea is made extending outwardly from an edge of a surface 18 of the tunnel profile element 10, and which is flush with the surface 18. When joining a first tunnel profile element 20 with a second tunnel profile element 20a, the second tunnel profile element is joined to the first tunnel profile element 20 by applying polyurea 21 on an outside surface of the patch 19 facing towards the inner side of the tunnel. Then the second tunnel profile element 20a is positioned onto the surface of the patch having polyurea. The second tunnel profile element 20a is pushed towards and joined with the first tunnel profile element 20. Polyurea may also be applied over the joint between the first and second tunnel profile element 20, 20a on the surface facing towards the interior of the tunnel. A completely water and fireproof joint is then established.

Figure 9:
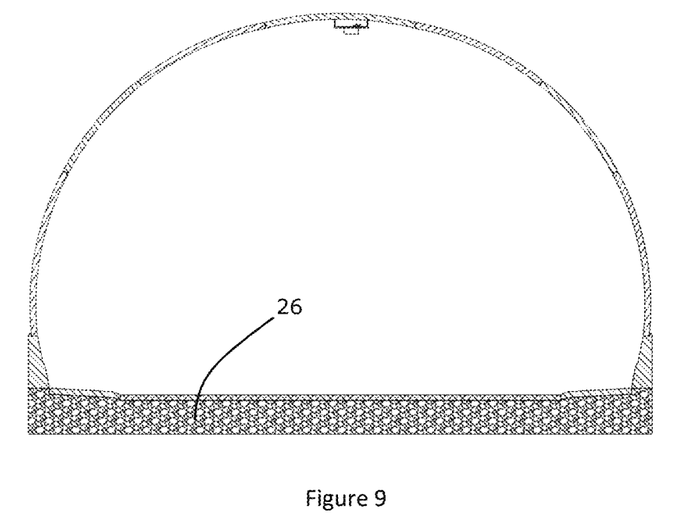
FIG. 9 illustrates an example of a floor in a tunnel according to the present invention.

An alternative of using a polyurea sprayed foam glass panels in the floor element 10c of a tunnel profile element 10, as illustrated for example in FIG. 1, is to install tunnel profile elements without floor elements 10c. Afterwards it is possible to distribute smashed foam glass panels (granulated foam glass) for example on the raw tunnel bottom and add a layer of asphalt on top of the smashed foam glass 30 as illustrated in FIG. 9. The smashed foam glass 30 provides the necessary frost insulation of the floor element 10c.

Figure 4:
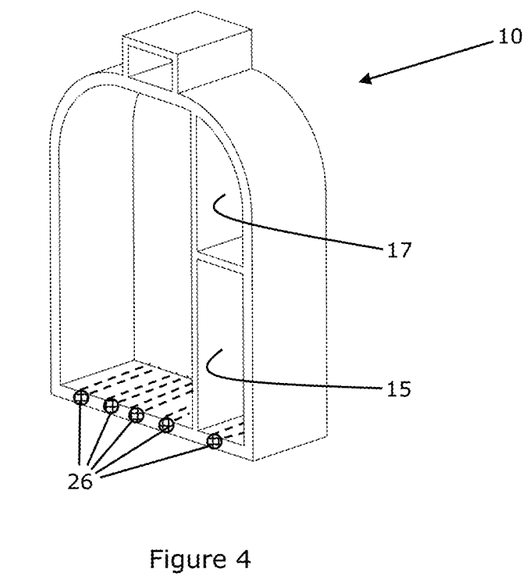
FIG. 4 illustrates another example of a tunnel profile element according to the present invention.

It is also possible to add reinforcement rods 26 inside foam glass panels used in a floor element 10c of a tunnel profile element 10. The rods 26 may be of steel or be made from a composite material. Examples of rods 26 are illustrated in FIG. 4.

Lightning is also part of an infrastructure of a tunnel. According to an aspect of the present invention, (Light Emitting Diodes) lights may be integrated into surfaces of the polyurea sprayed foam glass panels according to the present invention. Power and control signals can be conveyed to respective lights via added channels 11, 13, 14 etc. illustrated in FIG. 1 and FIG. 2.

Besides providing light inside the tunnel, LED lights can also contribute to the safety of driving inside a tunnel. For example, when a profile of a tunnel is rectangular, refer for example FIG. 1, the tunnel may be experienced by drivers of cars to be somehow narrow. If LED lights is arranged to make the illusion of a star filled sky, the visual impression of the tunnel changes dramatically. In long tunnels, drivers may experience the tunnel as extremely monotone, which may affect their awareness. It is possible to arrange sections of LED lights with different colors, intensity, and it is possible to change colors automatically within time periods, or by external control signals an known in prior art.

The weight of a typical tunnel profile element 10 according to the present invention is about 30 Kg/m$^2$. The thickness of the sides of the tunnel profile is typically about 10 cm of foam glass panels with an additional thickness of polyurea of 0.5 cm. However, the thickness can be increased if the frost conditions are severe in a tunnel. Therefore, a thickness of 25 cm is also possible. The weight will increase accordingly.

Figure 12:
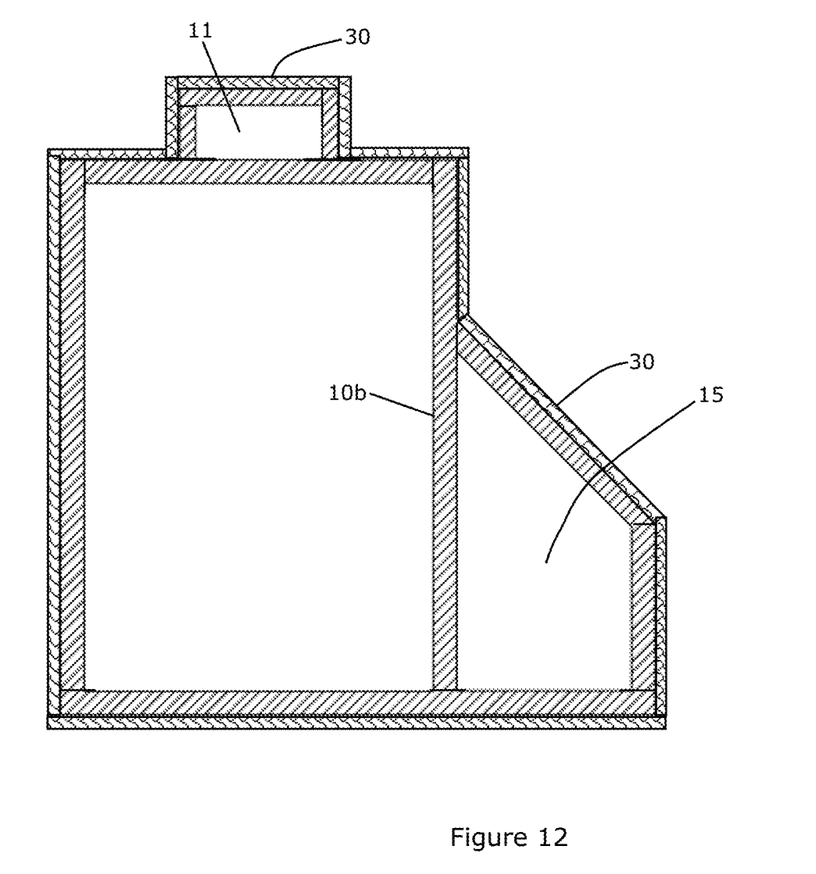
FIG. 12 illustrate a cross-sectional view of an example of an assembly frame for a tunnel element as depicted in FIG. 3.

Assembling of a tunnel profile element according to the present invention can be done by holding respective foam glass panels in a support structure or frame that is adapted or adaptable to specific dimensions of a tunnel profile element 10. Then a polyurea can be sprayed onto all surfaces of the tunnel profile element. A main aspect of the design is that it is not necessary to glue together respective panels forming the tunnel profile element before applying the polyurea. The polyurea itself holds the tunnel profile element together. It is also possible to add further foam glass panels or glass plates supported by the support frame, wherein the added plates or panels constitute for example channels 11 as discussed above. Added plates or panels can be sprayed with polyurea at the same time as the other foam glass panels of the tunnel profile element, or after the other panels are cured. An example of a method of assembling a tunnel profile element is disclosed below. FIG. 12 illustrate a frame 31 surrounding a profile element as depicted in FIG. 3.

The supporting frame can be made out of plywood panels, or steel plates, or by composite materials etc.

In some examples of embodiment of the present invention, the support frame is constituting an integral part of a finished tunnel profile element according to the present invention. Then it is preferable to use a support frame made of steel plates or composite materials.

In other examples of embodiment of the present invention, the support frame is supporting respective foam glass panels temporary and will not constitute an integral part of a finished tunnel profile element according to the present invention. For example, when spraying polyurea onto assembled foam glass panels, surface areas of the foam glass panels close up to the supporting frame is left unsprayed until the support frame is taken away from the assembly. The rest of the tunnel profile element is then sprayed with polyurea finishing the tunnel profile element with an unbroken polyurea layer. In this case, it is preferable that the support frame is made out of for example plywood plates. The continued spraying of polyurea may continue after the first applied polyurea is cured. Then the cured polyurea is holding the foam glass panels together during the continued spraying.

According to an example of embodiment of the present invention, a tunnel profile element 10 adaptable to respective aperture dimensions of raw tunnels comprises foam glass panels, wherein at least a tunnel floor element 10c, at least respective sidewall elements 10b and at least a roof element 10a of foam glass panels are hold together by a sprayed unbroken surface layer of polyurea on at least all visible outside surfaces of the assembled tunnel profile element 10.

Further, additional polyurea sprayed foam glass panels may constitute at least one airing channel element 11 arranged adjacent to the roof element 10a of the tunnel profile element 10.

Further, additional polyurea sprayed foam glass panels may constitute at least one escape-route tunnel element 15 arranged adjacent to at least one of the sidewalls 10b of the tunnel profile element 10.

Further, a roof element 16 of the escape-route tunnel element 15 may be inclined downwards relative to the adjacent sidewall element 10b of the tunnel profile element 10.

Further, the escape-route tunnel element 15 may comprise additional service channel elements 11, 13, 14, 17 constituted by additional polyurea sprayed foam glass panels.

Further, additional polyurea sprayed foam glass panels may constitute at least one channel element arranged adjacent to the floor element 10c and/or the respective sidewall elements 10b and/or the roof element 10a of the tunnel profile element 10.

Further, additional polyurea sprayed foam glass panels may constitute at least one cabinet, including a hinged door element of the cabinet, arranged adjacent to a sidewall element of the tunnel profile element.

Figure 11A:
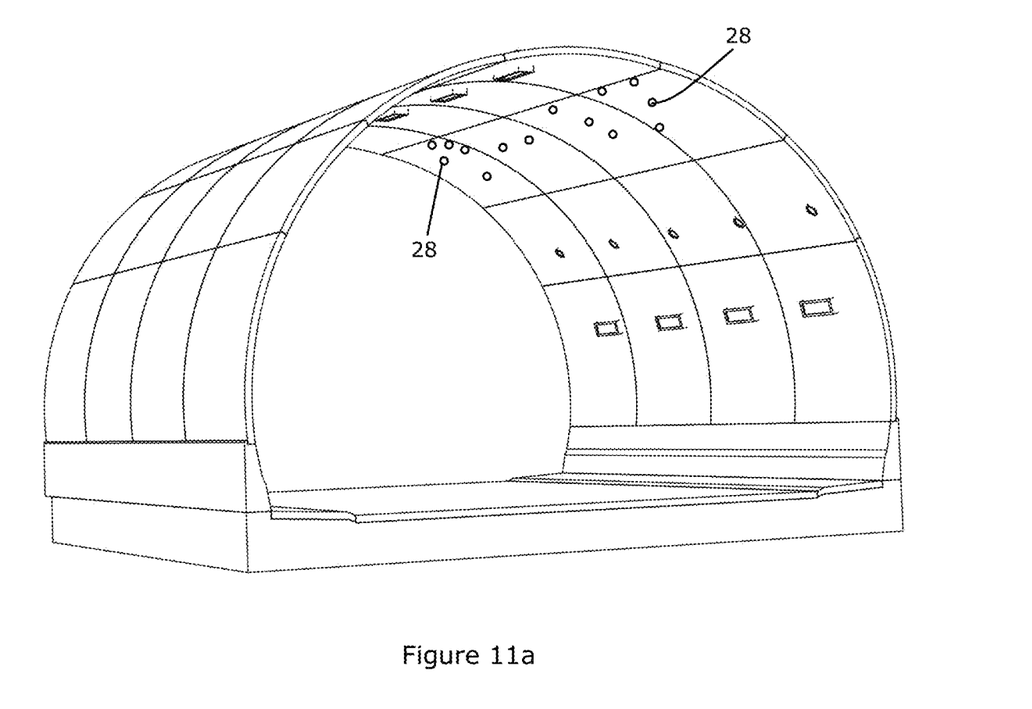
FIG. 11a illustrates an example of lightening assembly in a tunnel according to the present invention.
Figure 11B:
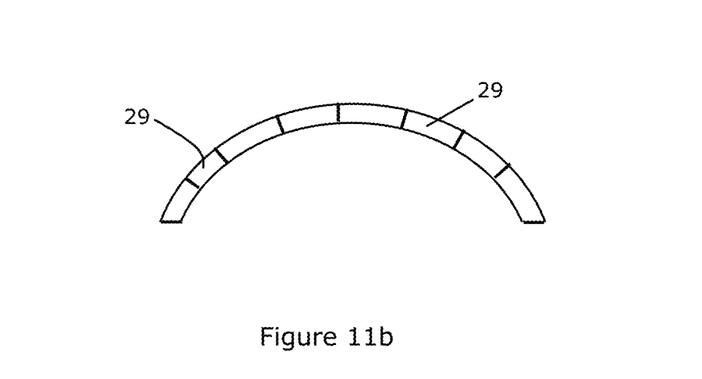
FIG. 11b illustrates a cross-sectional view of an example of a tunnel roof element.

Further, a plurality of assembled smaller polyurea sprayed foam glass panels 29 may constitute a curved roof surface as illustrated in FIG. 11b.

Further, the profile shape of the tunnel profile element may be rectangular.

Further, the weight of a tunnel profile element is about 30 kg/m².

Further, a thickness of respective foam glass panels is typically about 10 cm.

Figure 7B:
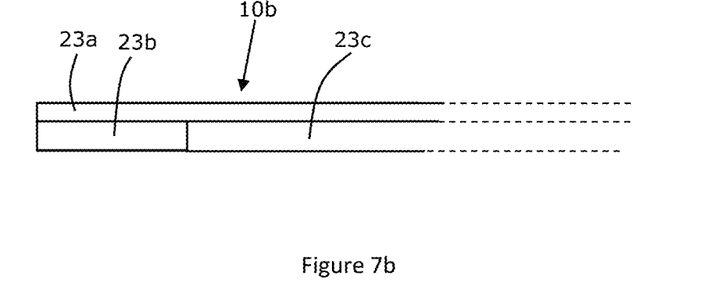

Further, the foam glass panels may be constituted by a plurality of sandwiched thinner foam glass plates 23a, 23b, 23c as illustrated in FIG. 7b.

Wherein a joint between a first thinner foam glass plate adjacent to a second thinner foam glass plate is covered by a third thinner foam glass plate located above or below the first and second thinner foam glass plate joints, wherein the sprayed unbroken polyurea layer is applied on the outer surfaces of the respective sandwiched foam glass plates, thereby forming a panel.

Further, a floor element 10c may arranged with a fluid drainage opening 12 being in fluid communication with a drainage pipe arranged below the floor element 10c of the tunnel profile element 10.

Further, granulated recirculated glass may constitute respective foam glass panels.

Figure 10:
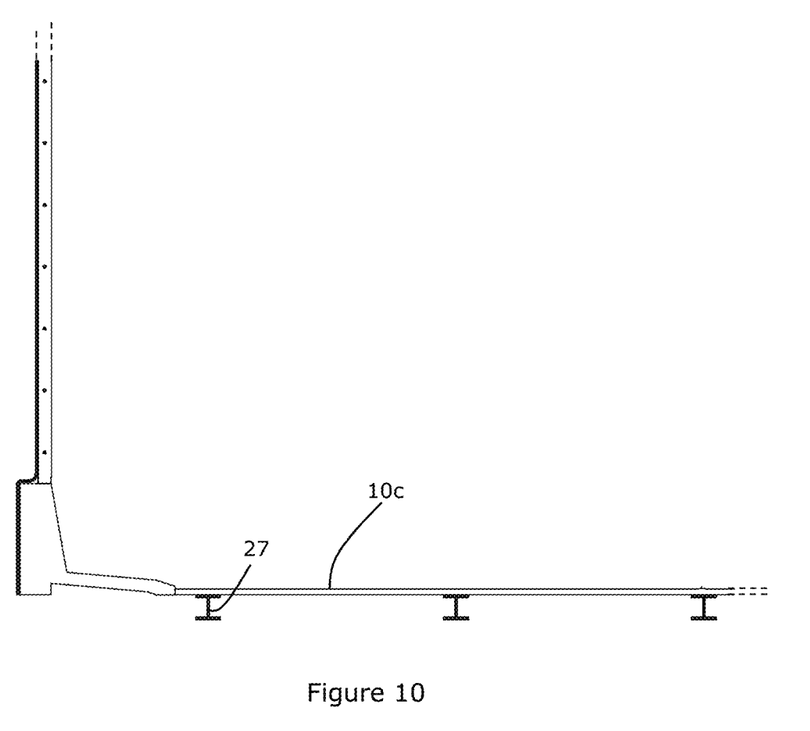
FIG. 10 illustrates another example of a floor in a tunnel according to the present invention.

Further, additional support elements 27 resting on the floor of the raw tunnel is supporting the floor element 10c of the tunnel profile element 10 as illustrated in FIG. 10.

Further, additional reinforcements rods may be included in the foam glass panels of the floor elements.

Further, a layer of smashed foam glass covered by asphalt may constitute the floor element 10c of the tunnel profile element 10.

Further, light emitting diodes (LED lights) may be arranged in respective sidewall elements 10b and/or roof elements 10a of a tunnel profile element according to the present invention.

Further, LED lights 28 in the roof element 10a may be configured as a star filled sky as illustrated in FIG. 11a.

Further, the LED lights may be configured to change color on a regular basis, or in accordance with an externally submitted command.

According to an example of embodiment of the present invention, a method of assembling a tunnel profile element according to the present invention comprises steps of:
 defining a shape and dimension of the tunnel profile element (10),
 arranging a support frame with the shape and dimension of the defined tunnel profile element,
 holding respective adapted foam glass panels in the support frame; and
 spraying an unbroken layer of polyurea on at least all visible outside surfaces of the foam glass panels supported by the support frame.

Further, the support frame may be sprayed with polyurea thereby integrating the support frame in a finished tunnel profile element.

Further, the sprayed polyurea layer may be partly covering the supported foam glass panel surfaces close up to, but not covering the support frame, and after the partly sprayed polyurea layer is cured, the supporting frame is removed followed by a step of spraying the rest of all visible outside surfaces of the foam glass panels with polyurea.

Further, an unbroken layer of polyurea may be constituted by spraying a first part of a polyurea layer followed by spraying a second part of the polyurea layer overlapping at least partly the first polyurea layer.

Further, additional foam glass panels arranged in the support frame may constitute further units of a finished tunnel profile 10 according to the present invention.

Further, the additional foam glass panels may sprayed with polyurea at the same time as the other outside surfaces of the other foam glass panels of the tunnel profile element is sprayed.

Further, the additional foam glass panels are sprayed after the other outside surfaces of the tunnel profile element is sprayed and cured.

Further, the sprayed polyurea layer may extend outside at least an edge of a surface, and flush with said surface, constituting an outwardly protruding patch 19 of the tunnel profile element.

The method of claim 1, wherein the support frame is sprayed with polyurea thereby integrating the support frame in a finished tunnel profile element.

Further, the sprayed polyurea layer may partly be covering the supported foam glass panel surfaces close up to, but not covering the support frame, after the partly sprayed polyurea layer is cured, the supporting frame may be removed followed by a step of spraying the rest of all visible outside surfaces of the foam glass panels with polyurea.

Further, additional foam glass panels may be sprayed with polyurea at the same time as other outside surfaces of other foam glass panels of the tunnel profile element is sprayed.

Further, additional foam glass panels may be sprayed after other outside surfaces of the tunnel profile element is sprayed and cured.

Further, a sprayed polyurea layer may extend outside at least an edge of a surface of the tunnel profile element, and flush with said surface, constituting an outwardly protruding patch of the tunnel profile element.

Further, an unbroken layer of polyurea may be constituted by spraying a first part of a polyurea layer followed by spraying a second part of the polyurea layer overlapping at least partly the first part of the polyurea layer.

The invention claimed is:

1. A tunnel profile element for installation in raw tunnels, the tunnel profile element comprising:
   a plurality of foam glass panels assembled to form at least one floor element, at least one sidewall element and a roof element of the tunnel profile element, wherein the assembled foam glass panels of the tunnel profile element are held together by an unbroken layer of polyurea covering all exposed surfaces of the tunnel profile element; and
   wherein the tunnel profile element is insertable into a tunnel via a tunnel opening to provide a lining over exposed raw tunnel surfaces at a section of the tunnel opening where the tunnel profile element is placed.

2. The tunnel profile element of claim 1, further comprising:
   at least one infrastructure foam glass panel mated with at least one of the plurality of foam glass panels; and
   an unbroken layer of polyurea applied to the at least one infrastructure foam glass panel to form an infrastructure element on an interior or exterior of the tunnel profile element, wherein the infrastructure element comprises an airing channel element arranged adjacent to the roof element of the tunnel profile element.

3. The tunnel profile element of claim 1, further comprising:
   at least one infrastructure foam glass panel mated with at least one of the plurality of foam glass panels; and
   an unbroken layer of polyurea applied to the at least one infrastructure foam glass panel to form an infrastructure element on an interior or exterior of the tunnel profile element, wherein the infrastructure element comprises an escape-route tunnel element arranged adjacent to the at least one sidewall element of the tunnel profile element.

4. The tunnel profile element of claim 3, wherein a roof element of the escape-route tunnel element is inclined downwards relative to the at least one sidewall element of the tunnel profile element.

5. The tunnel profile element of claim 3, wherein the escape-route tunnel element comprises at least one escape-route foam glass panel mated with at least one of the plurality of foam glass panels, and an unbroken layer of polyurea applied to the at least one escape-route foam glass panel to form at least one service channel element.

6. The tunnel profile element of claim 1, further comprising:
   at least one channel foam glass panel mated with at least one of the plurality of foam glass panels; and
   an unbroken layer of polyurea applied to the at least one channel foam glass panel to form at least one channel element on an interior or exterior of the tunnel profile element, wherein the at least one channel element is arranged adjacent to at least one of the at least one floor element, the at least one sidewall element or the roof element of the tunnel profile element.

7. The tunnel profile element of claim 1, wherein additional polyurea sprayed foam glass panels constitute at least one cabinet, including a hinged door element of the at least one cabinet, arranged adjacent to the at least one sidewall element of the tunnel profile element.

8. The tunnel profile element of claim 1, wherein the roof element comprises a curved roof element formed from a plurality of smaller foam glass panels with the unbroken layer of polyurea applied to the smaller foam glass panels.

9. The tunnel profile element of claim 1, wherein the floor element, at least one sidewall element and roof element are mated to form a substantially rectangular profile.

10. The tunnel profile element of claim 1, wherein the tunnel profile element weighs about 30 kg/m$^2$.

11. The tunnel profile element of claim 1, wherein a thickness of each of the plurality of foam glass panels is about 10 cm.

12. The tunnel profile element of claim 1, wherein the foam glass panels are constituted by a plurality of sandwiched thinner foam glass plates, wherein a joint between a first thinner foam glass plate adjacent to a second thinner foam glass plate is covered by a third thinner foam glass plate located above or below the first and second thinner foam glass plates, and wherein the sprayed unbroken polyurea layer is applied on the outer surfaces of the respective sandwiched foam glass plates thereby constituting the foam glass panel.

13. The tunnel profile element of claim 1, wherein the at least one floor element comprises a fluid drainage opening.

14. The tunnel profile element of claim 1, wherein additional support elements resting on a floor of the raw tunnel is supporting the at least one floor element of the tunnel profile element.

15. The tunnel profile element of claim 1, wherein additional reinforcement rods are included in the foam glass elements of the at least one floor element.

16. The tunnel profile element of claim 1, wherein light emitting diode (LED) lights are arranged in at least one of the at least one sidewall element and the roof element.

17. The tunnel profile element of claim 16, wherein the LED lights are configured to change color on a regular basis, or in accordance with an externally submitted command.

18. A tunnel profile element adaptable for installation in raw tunnels, the tunnel profile element comprising:
   a plurality of foam glass panels assembled to form a first sidewall element, a second sidewall element and a roof element, wherein a first end of the first sidewall element is mated with the roof element and a first end of the second sidewall element is mated with the roof element such that the first sidewall element is spaced from the second side wall element, wherein the assembled foam glass panels to form the first sidewall element, the second sidewall element and the roof element of the tunnel profile element are held together by an unbroken layer of polyurea covering all exposed surfaces of the tunnel profile element; and wherein the tunnel profile element is insertable into a tunnel via a tunnel opening to provide a lining over exposed raw tunnel surfaces at a section of the tunnel opening where the tunnel profile element is placed.

19. The tunnel profile element of claim 18, wherein the assembled plurality of foam glass panels further comprise a floor element mated with a second end of the first sidewall element and a second end of the second sidewall element.

20. The tunnel profile element of claim 18, further comprising a floor element formed of a layer of smashed foam glass covered by asphalt after the tunnel profile element is installed in the raw tunnels.

21. The tunnel profile element of claim 18, further comprising at least one infrastructure foam glass panel mated with at least one of the plurality of foam glass panels on an interior surface or exterior surface of the tunnel profile element, and an unbroken layer of polyurea is applied to the mated at least one infrastructure foam glass panel to form an infrastructure element.

22. The tunnel profile element of claim 21, wherein the infrastructure element comprises an escape-route tunnel element arranged adjacent to the first sidewall element or the second sidewall element.

23. The tunnel profile element of claim 21, wherein the infrastructure element comprises an airing channel element arranged adjacent to the roof element.

24. The tunnel profile element of claim 21, wherein the infrastructure element comprises at least one channel element arranged adjacent to at least one of the first sidewall element, the second sidewall element or the roof element.

25. A tunnel profile element adaptable for installation in raw tunnels, the tunnel profile element comprising:

a plurality of foam glass panels that include a tunnel floor element, a first sidewall element, a second sidewall element and a roof element; and wherein the plurality of foam glass panels are assembled such that a first end of the first sidewall element is mated with the tunnel floor element and a second end of the first sidewall element is mated with the roof element, a first end of the second sidewall element is mated with the tunnel floor element and a second end of the second sidewall element is mated with the roof element such that the first sidewall element is spaced from the second side wall element, and wherein the assembled foam glass panels of the tunnel profile element are held together by an unbroken layer of polyurea covering all exposed surfaces of the tunnel profile element; and wherein the tunnel profile element is insertable into a tunnel via a tunnel opening to provide a lining over exposed raw tunnel surfaces at a section of the tunnel opening where the tunnel profile element is placed.

26. The tunnel profile element of claim 25, further comprising at least one infrastructure foam glass panel mated with at least one of the plurality of foam glass panels on the interior or the exterior of the tunnel profile element, and an unbroken layer of polyurea applied to the mated at least one infrastructure foam glass panel to form an infrastructure element.

27. The tunnel profile element of claim 26, wherein the infrastructure element comprises at least one of an escape-route tunnel element arranged adjacent to the first or second sidewall elements, an airing channel element arranged adjacent to the roof element or a channel element arranged adjacent to at least one of the first sidewall element, the second sidewall element or the roof element.

* * * * *